US008504435B2

(12) United States Patent
Charles

(10) Patent No.: US 8,504,435 B2
(45) Date of Patent: Aug. 6, 2013

(54) GROUP OFFERS FOR DIRECT SALES SYSTEM EMPLOYING NETWORKED MOBILE COMPUTING DEVICES

(75) Inventor: Jade Makani Roberge Charles, San Diego, CA (US)

(73) Assignee: Fragmob, LLC, San Diego, CA (US)

( * ) Notice: Subject to any disclaimer, the term of this patent is extended or adjusted under 35 U.S.C. 154(b) by 12 days.

(21) Appl. No.: 13/406,501

(22) Filed: Feb. 27, 2012

(65) Prior Publication Data

US 2013/0054324 A1 Feb. 28, 2013

Related U.S. Application Data

(63) Continuation of application No. 13/282,419, filed on Dec. 26, 2011, which is a continuation-in-part of application No. 13/223,268, filed on Aug. 31, 2011.

(51) Int. Cl.
  *G06Q 30/00* (2012.01)
(52) U.S. Cl.
  USPC ... 705/26.1; 705/14.16; 705/26.4; 705/26.41; 705/27.1
(58) Field of Classification Search
  USPC .......................................................... 705/26.1
  See application file for complete search history.

(56) References Cited

U.S. PATENT DOCUMENTS

| | | | | |
|---|---|---|---|---|
| 6,421,648 | B1 * | 7/2002 | Gagnon et al. | 705/1.1 |
| 7,412,408 | B1 * | 8/2008 | Palazzo | 705/26.2 |
| 7,912,751 | B1 * | 3/2011 | Allos | 705/14.16 |
| 8,301,495 | B2 * | 10/2012 | Mason | 705/14.1 |
| 2004/0093269 | A1 * | 5/2004 | Rubin et al. | 705/14 |
| 2006/0235749 | A1 * | 10/2006 | Moc | 705/14 |
| 2006/0282282 | A1 * | 12/2006 | Spechler et al. | 705/1 |
| 2009/0276305 | A1 * | 11/2009 | Clopp | 705/14.16 |
| 2010/0262478 | A1 * | 10/2010 | Bamborough et al. | 705/14.16 |
| 2010/0287112 | A1 * | 11/2010 | Hawkins | 705/345 |
| 2012/0010926 | A1 * | 1/2012 | Urso | 705/7.42 |
| 2012/0036014 | A1 * | 2/2012 | Sunkada | 705/14.54 |
| 2012/0109732 | A1 * | 5/2012 | Jaffe | 705/14.25 |
| 2012/0265600 | A1 * | 10/2012 | Mesaros | 705/14.35 |
| 2012/0296705 | A1 * | 11/2012 | Bayan et al. | 705/7.42 |
| 2013/0006741 | A1 * | 1/2013 | Mesaros | 705/14.23 |
| 2013/0013420 | A1 * | 1/2013 | Bamborough et al. | 705/14.69 |

FOREIGN PATENT DOCUMENTS

EP 1077422 A2 * 2/2001

OTHER PUBLICATIONS

Robert J. Kauffman et al., New Buyers' Arrival Under Dynamic Pricing Market Microstructure: The Case of Group-Buying Discounts on the Internet, 2001, Proceedings of the 34th Hawaii International Conference on System Sciences, pp. 1-10 <http://ieeexplore.ieee.org/stamp/stamp.jsp?tp=&arnumber=927065>.*

* cited by examiner

*Primary Examiner* — Bradley B Bayat
(74) *Attorney, Agent, or Firm* — Mark Terry

(57) ABSTRACT

A method on a server for managing sales activities and group buying offers for a plurality of users over a communications network is disclosed. The method includes receiving sales transaction data from the users, receiving recruit enrollment data from the users, processing the sales transaction data and the recruit enrollment data to generate aggregate data pertaining to sales, transmitting the aggregate data to the users, receiving a group buying offer, transmitting the group buying offer to the users, receiving acceptances of the group buying offer, calculating a number of acceptances of the group buying offer, effectuating a sale of the product or service of the group buying offer to each of the users who accepted the offer, if the number of acceptances of the group buying offer is greater than a minimum number, and attributing a particular sale to a recruiter, so as to award a commission.

9 Claims, 4 Drawing Sheets

GROUP OFFERS FOR DIRECT SALES SYSTEM EMPLOYING NETWORKED MOBILE COMPUTING DEVICES

CROSS-REFERENCE TO RELATED APPLICATIONS

This patent application is a continuation of, and claims priority to, U.S. patent application Ser. No. 13/282,419, filed Oct. 26, 2011, which is a continuation-in-part of, and claims priority to, U.S. patent application Ser. No. 13/223,268 filed on Aug. 31, 2011 and titled "Management of Direct Sales Activities on Networked Mobile Computing Devices." The subject matter of U.S. patent application Ser. No. 13/282,419 and U.S. patent application Ser. No. 13/223,268 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The present invention relates to the field of sales, advertising and marketing and, more specifically, the present invention relates to the field of direct sales activities on electronic devices.

BACKGROUND OF THE INVENTION

The present invention relates to direct sales activities of all types. Direct selling is the marketing and selling of products directly to consumers away from a fixed retail location. Modern direct selling includes sales made through a party plan, one-on-one demonstrations, and other personal contact arrangements, as well as internet sales. Thus, direct sales include direct personal presentation, product demonstration, and sale of products and services to consumers, usually in their homes or at their jobs. One form of direct selling includes multi-level marketing (MLM), which is a marketing strategy in which a sales force is compensated not only for product sales they personally generate, but also for the product sales of others they recruit, creating a downstream of distributors and a hierarchy of multiple levels of compensation.

Salesmen involved in direct selling are usually compensated based on a commission basis or similar arrangement. Predefined sales milestones are also used to delineate when a salesman is awarded a bonus or award. As such, active salesmen constantly stay abreast of various performance indicators, such as the amount of their cumulative sales, the amount of their recruit's cumulative sales, proximity to the next milestone, the status of prospective recruits or prospective customers, etc.

In the past, sales performance indicators were calculated and disseminated via paper. As individuals were recruited and sales transactions occurred, the related information was tallied at a central location and then disseminated on a periodic basis, such as in hard copy, to each salesman. One problem with the conventional approach, however, is that a salesman is not aware of the current status of his performance indicators in between periodic reports. This reduces the ability of the salesman to optimize his activities in between reports, so as to attain his goals or milestones. Another problem with the conventional approach is that sales and recruitment transaction data are transcribed, recorded and processed with the aid of individuals. This makes the resulting data vulnerable to human error and therefore lacking in high levels of accuracy.

Furthermore, the conventional recruiting process involves meeting and communicating with prospective recruits, following up with the recruits, and handling the process of enrolling new recruits in the sales program. In addition, the conventional sales process involves communicating with prospective buyers, showing the products for sale, handling the sales transaction and arranging the shipping or delivery of the products. All of the aforementioned sales activities involve time-consuming tasks including travel, personal meetings, data entry and paperwork. With the increasing demands on individuals' time in modern society, the time demands of conventional direct sales act as a barrier to entry for many individuals today.

Moreover, there is a need to offer discounts to consumers of direct sales. Discounts are an integral part of retail strategies for many goods and services. Vendors rely upon discounts for a variety of reasons, such as to promote new and existing goods and services and to increase the sales of that particular item or service, or to increase the sales of the merchant's other goods and services. Further, consumers rely upon discounts as a way to reduce their costs. Discount techniques include providing coupons and rebates to potential customers, but these techniques have several disadvantages, such as a historically small percentage of consumer participation and fraud. Further, advertising and marketing associated with coupons and rebates can be expensive when done through radio or television medium, and extremely ineffective when done through print advertisements. Regardless of the advertising medium, however, there is very little reason for the consumer to pass along the advertisement or coupon to others, so that a merchant must advertise or market the discount to each individual.

Another drawback of current discount techniques includes the risk taken by the vendor due to an inadequate sales volume. A vendor offers coupons or rebates in the hopes of securing future sales at full retail prices, repeat sales and ultimately an increase in overall sales. Ultimately, vendors cannot offer goods and services at a discount unless the vendor can ensure a minimum number of sales to justify the discount. But there is currently no system to mutually satisfy a consumer with a discount and the vendor with a minimum number of sales. There is also no current system that utilizes the strength of a social network to distribute information about the discounts, and create an incentive to distribute the information about the discount.

Therefore, what is needed is a system and method for improving the problems with the prior art, and more particularly for a more efficient method and system for facilitating direct sales activities.

BRIEF SUMMARY OF THE INVENTION

In one embodiment, the present invention discloses a method on a server for managing sales activities and group buying offers for a plurality of users over a communications network. The method includes receiving sales transaction data from mobile computers of the plurality of users via the communications network; receiving recruit enrollment data from the mobile computers via the communications network; processing the sales transaction data and the recruit enrollment data to generate aggregate data pertaining to sales effectuated by each of the plurality of users and pertaining to sales effectuated by recruits of each of the plurality of users; transmitting the aggregate data to the mobile computers of the plurality of users via the communications network; receiving a group buying offer from an administrative user, wherein a group buying offer comprises at least a product or service description, a discount price and a minimum number of acceptances of the offer that are required to trigger the discount price; transmitting the group buying offer to the mobile computers of the plurality of users; receiving acceptances of the group buying offer from the mobile computers of the plurality of users; calculating a number of acceptances of the group buying offer; effectuating a sale of the product or service of the group buying offer to each of the users who accepted the offer, if the number of acceptances of the group buying offer is greater than or equal to the minimum number of acceptances of the offer; and attributing a particular sale of the product or service to a first user who recruited a buyer of the particular sale, so as to award a commission to the first user.

In another embodiment, the present invention discloses a method on a mobile computer for managing sales activities and group buying offers for a first user over a communications network. The method includes accepting sales transaction data via an application on the mobile computer, wherein the mobile computer transmits the sales transaction data to a central server via the communications network; accepting recruit enrollment data via the application, wherein the mobile computer transmits the recruit enrollment data to the central server via the communications network; receiving by the mobile computer from the central server, via the communications network, aggregate data pertaining to sales effectuated by the first user and pertaining to sales effectuated by recruits of the first user; displaying the aggregate data for the first user on the mobile computer; receiving by the mobile computer from the central server, via the communications network, a group buying offer, wherein a group buying offer comprises at least a product or service description, a discount price and a minimum number of acceptances of the offer that are required to trigger the discount price; accepting an acceptance of the offer by the first user via an application on the mobile computer; transmitting an acceptance of the offer by the first user to the central server over the communications network; and receiving by the mobile computer from the central server, via the communications network, a receipt for a sale of the product or service of the group buying offer, if the number of acceptances of the group buying offer is greater than or equal to the minimum number of acceptances of the offer.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1:
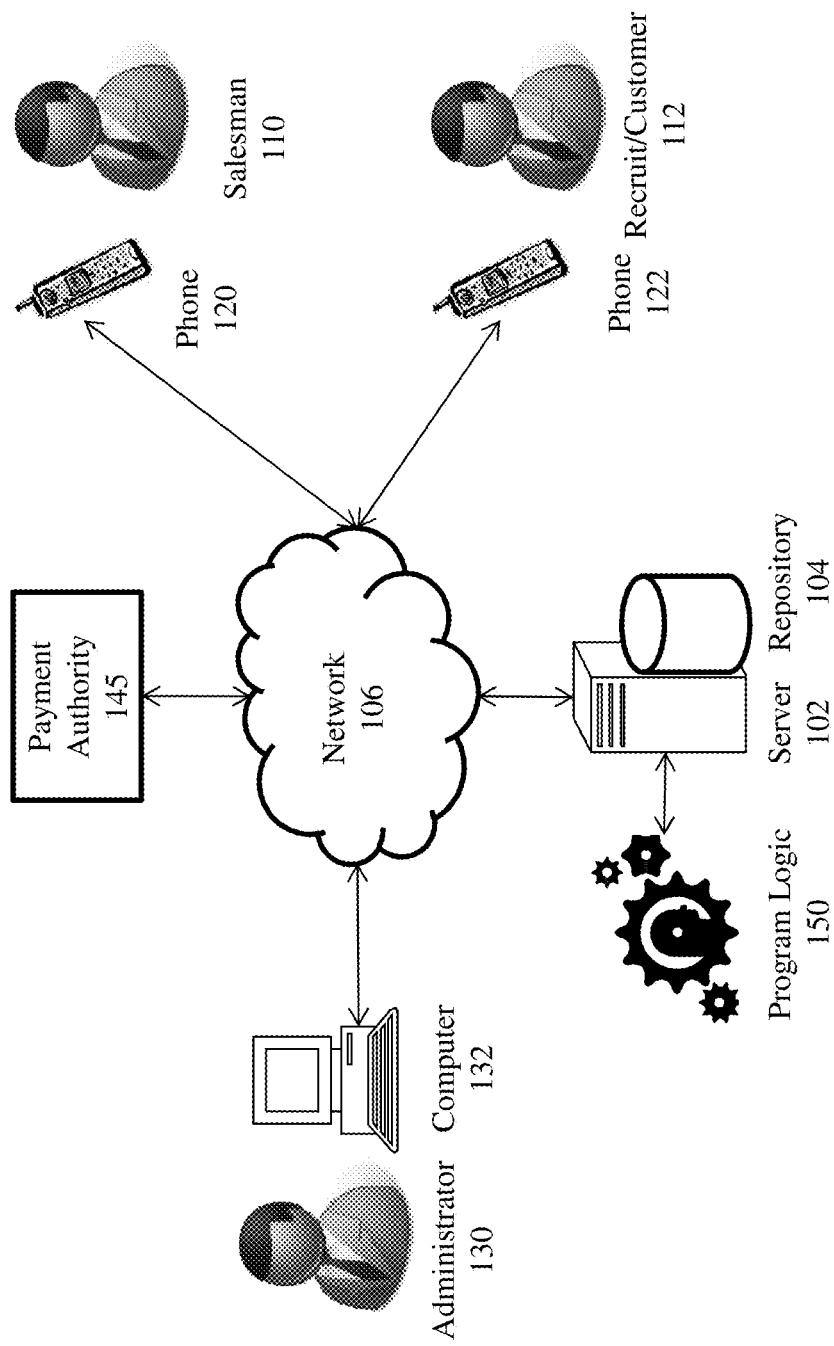
FIG. 1 is a block diagram illustrating the network architecture of a system for providing management of sales activities, group buying offers and data over a communications network, in accordance with one embodiment of the present invention.

The present invention improves upon the problems with the prior art by providing a group buying offer system that provides discounts for consumers while at the same time providing a minimum number of discounted sales for vendors. Group buying, also known as collective buying, offers products and services at significantly reduced prices on the condition that a minimum number of buyers make the purchase. The present invention also utilizes the strength of a social network, along with a guarantee that the discounted price will only have to be honored if a minimum number of customers accept the group buying offer for the goods or services. Accordingly, a vendor can provide a greater or deeper discount knowing that at least a certain number of sales will occur at that discount.

The present invention further provides a system that grants commissions for the discounted sales to the users that recruited the buyers, thereby providing an incentive for recruiters to push the group buying offers. This provides a dual-incentive system whereby a) consumers have a financial incentive to purchase discounted goods or services via the group buying offers, and b) the recruiters of the consumers have an incentive (i.e., a commission) to persuade the consumers to purchase the discounted goods or services.

The present invention further improves upon the problems with the prior art by providing a more efficient method and system for managing direct sales activities, recruitment/sales data and related information on networked computing devices, both mobile and non-mobile. In one embodiment, the present invention provides a mobile computing device, wherein salesmen may effectuate product sales, enroll recruits and view sales performance indicators. This allows salesmen to perform basic sales and recruitment activities while on the road and away from the home or the office, thereby facilitating sales activities and keeping the salesmen posted on sales performance indicators while on the go.

Additionally, the present invention provides a scalable and easy-to-use system for allowing sales participants and administrators of the system to log onto a central server/repository to manage and view sales data and sales performance indicators. Data can be analyzed and viewed in aggregate, by demographic data, by salesman or recruit, by location, etc. The present invention further improves over the prior art by providing a centralized system for gathering and managing various types of data associated with direct sales activities, including multi-level marketing (MLM) activities.

Finally, the present invention improves upon the prior art by providing technologically advanced methods for advertising and promotion in a direct sales environment using mobile technology. The present invention employs the use of push technology to push promotions and ads to customers and salesmen. This is advantageous as it facilitates commerce over a communications network and speeds up the process of fielding promotions and ads to a large sales force.

Referring now to the drawing figures in which like reference designators refer to like elements, there is shown in FIG. 1 an illustration of a block diagram showing the network architecture of a system and method for providing management of direct sales activities, group buying offers and data over a communications network in accordance with the principles of the present invention. The most prominent element of FIG. 1 is the server 102 associated with repository or database 104 and further coupled with network 106, which can be a circuit switched network, such as the Public Service Telephone Network (PSTN) or a packet switched network such as the Internet or the World Wide Web. Server 102 is a central controller or operator for the functionality that executes on computers 120, 122 and 132, namely, the processing of sales and enrollment transactions, as well as the processing of aggregate sales data and group buying offers, all of which are provided to the users 110, 112 and 130, wherein the provision of the foregoing services and data facilitates the performance of direct sales activities. Aggregate sales data, or aggregate data pertaining to sales, pertains to an aggregation, or a cumulative sum, for example, of all sales that are effectuated by a single salesman, by one of the salesman's recruits, by all of the salesman's recruits, any combination of the above, or the like.

FIG. 1 further includes mobile computers 120 and 122, which may be smart phones, mobile phones, tablet computers, handheld computers, laptops, or the like. Mobile computers 120 and 122 correspond to a salesman 110 and a recruit or customer 112 of the salesman 112. A salesman 110, also known as a distributor, is a member of a direct sales force who sells products to customers and recruits others to do the same. A salesman's recruits may also be known as distributors. A salesman 110 receives compensation for his own product sales, as well as the sales of his recruits, often via a commission. A customer simply refers to a person to whom a salesmen sales products or services. Computer 132 corresponds to an administrator 130, who may perform supervisory or administrative tasks on server 102. Administrator 130 may, for example, set sales milestones for the users 110, 112 and prepare and disseminate group buying offers. Computer 132 may be a mobile computer, a desktop computer, a common computer terminal or the like.

FIG. 1 further shows that server 102 includes a database or repository 104, which may be a relational database comprising a Structured Query Language (SQL) database stored in a SQL server. Client computers 120, 122 and 132 may also each include their own database. The repository 104 serves data from a database, which is a repository for data used by server 102 and the client computers during the course of operation of the invention.

The database 104 may include a user record for each salesman 110 and recruit or customer 112. A user record may include: contact/identifying information for the user, contact/identifying information for the participant that recruited the user (if any), information pertaining to sales attributed to the user, contact/identifying information for recruits of the user, information pertaining to recruitment activity of the user, information pertaining to sales attributed to recruits of the user, electronic payment information for the user, information pertaining to calls made by the user, information pertaining to the purchases made by the user, etc. A user record may also include a unique identifier for each user, a residential address for each user, the current location of each user (based on located-based services from the user's mobile computer) and a description of past products purchased by each user. A user record may further include demographic data for each user, such as age, sex, income data, race, color, marital status, etc. Recruit enrollment data includes any data that is entered into a user record for a recruit or customer 112 when the recruit or customer is recruited and enrolled by a salesman 112.

Sales transaction data, for example, may be stored in the database 104 and associated with a record for the user initiating the sale and/or the customer purchasing products or services. Sales transaction data may include one or more product identifiers, one or more product amounts, buyer contact/identifying information, product shipping information and electronic payment information. In one embodiment, electronic payment information may comprise buyer contact/identifying information, credit card data garnered from a credit or debit card and authentication information. Recruitment activity data, for example, may also be stored in the database 104 and associated with a record for the user performing the recruitment. Recruitment activity data may include contact/identifying information for prospective and active recruits, updates on follow up communications with prospective and active recruits, information pertaining to phone calls with prospective and active recruits, and status information for prospective and active recruits.

The database 104 may also include a record for each administrator 130. A record for an administrator may include: commission data that defines how salesmen are compensated for their own sales, commission data that defines how salesmen are compensated for the sales of their recruits, milestone data that defines thresholds that result in an award, personal sales goals, group sales goals, etc.

The database 104 may further include a record for each group buying offer created by a user, such as administrative user 130. A group buying offer may comprise a product or service description, an image of the product or service, a discount price, a minimum number of acceptances of the offer that are required to trigger the discount price, an expiration date and time for the offer, a current number of acceptances of the offer, computer program code that comprises a countdown timer that counts down to the time at which the group buying offer expires, etc. In another embodiment, a group buying offer may comprises a tiered discount system wherein a first number of acceptances triggers a first discount price, a second (higher) number of acceptances triggers a second (lower) discount price, a third (even higher) number of acceptances triggers a third (even lower) discount price, etc.

FIG. 1 shows an embodiment of the present invention wherein networked computing devices 120, 122 and 132 interact with server 102 and repository 104 over the network 106. Server 102 includes a software engine that delivers applications, data, program code and other information to networked computing devices 120, 122 and 132. The software engine of server 102 may perform other processes such as audio and/or video streaming or other standards for transferring multimedia data in a stream of packets that are interpreted and rendered by a software application as the packets arrive. It should be noted that although FIG. 1 shows only three networked computing devices 120, 122 and 132, the system of the present invention supports any number of networked computing devices connected via network 106.

In one embodiment of the present invention, the application provided by the server 102 of FIG. 1 is a client-server application having a client portion that resides on a client computer (i.e., 120, 122 and 132) and a server application that resides on server 102. For example, the application can be a web interface that is accessed by a client computer via network 106. The application served by server 102 may be written using any of the following technologies: CSS (Cascading Style Sheets), DOM (Document Object Model), JavaScript, XPCOM (Cross-Platform Component Object Model), XPConnect, XPI (Cross-Platform Installer), XUL (XML User Interface Language).

Server 102 includes program logic 150 comprising computer source code, scripting language code or interpreted language code that is compiled to produce computer instructions that perform various functions of the present invention. In one embodiment of the present invention, the program logic is a scripting language such as ECMAScript, CSS, XML (Extensible Markup Language), XSLT (Extensible Style-sheet Language Transformations), Javascript, AJAX (Asynchronous JavaScript and XML), XUL, JSP, PHP, and ASP (Active Server Pages). Program logic 150 may reside on a client computer, the server 102 or any combination of the two.

Note that although server 102 is shown as a single and independent entity, in one embodiment of the present invention, the functions of server 102 may be integrated with another entity, such as one of the client computers or payment authority 145. Further, server 102 and its functionality, according to a preferred embodiment of the present invention, can be realized in a centralized fashion in one computer system or in a distributed fashion where different elements are spread across several interconnected computer systems.

The network architecture of FIG. 1 in accordance with the principles of the present invention may give rise to various revenue-generating arrangements. The users 110, 112 may, for example, sale products via the application of the present invention and recruit others to do the same. The users 110, 112 may also, for example, pay an ongoing or per-transaction fee to the operators of server 102 in exchange for the services provided by server 102.

FIG. 1 also shows a payment authority 145 to effectuate payments by salesman 110 and/or recruit/customer 112 for products, services or the like. In the course of a sales transaction, the program logic 150 may interface with payment authority 145 to effectuate payment. In one embodiment of the present invention, the payment authority 145 is a payment gateway, which is an e-commerce Application Service Provider (ASP) service that authorizes payments for individuals, e-businesses, online retailers, or traditional brick and mortar businesses. The payment authority 145 may accept payment via the use of credit cards, charge cards, bank cards, gift cards, account cards, etc.

Figure 2:
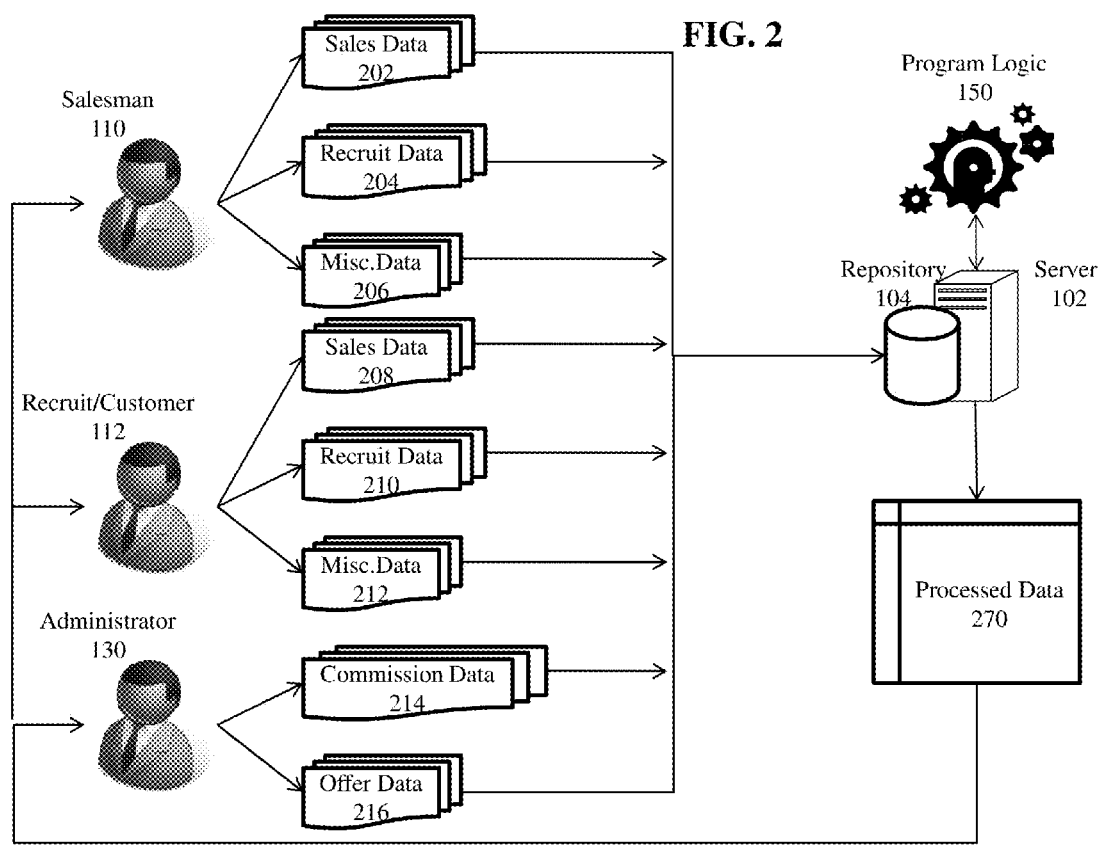
FIG. 2 is a block diagram showing the various data that is entered, stored, processed and managed according to one embodiment of the present invention.

FIG. 2 is a block diagram showing the various data that is entered, stored, processed and managed according to one embodiment of the present invention. FIG. 2 shows that salesman 110 may enter various data sets into repository 104 for processing and management by program logic 150 on server 102. Salesman 110 may enter sales transaction data 202, which pertains to sales of products effectuated by the salesman 110. Salesman 110 may also enter recruitment activity data 204, which pertains to recruitment of others to participate in the sales force. Salesman 110 may also enable the entering of other miscellaneous data 204, such as information associated with telephone calls initiated by the salesman, social media updates provided by the salesman, text messages entered by the salesman, status messages entered by the salesman, audio/video/images entered by the salesman and self-defined sales goals of the salesman.

Data sets 202, 204 and 206 may be entered into repository 104 by the salesman 110 via its client computer 120, using a mobile app or a similar means. Note that data sets 202, 204 and 206 entered into repository 104 are associated with the user record for salesman 110. To the extent that certain information within data sets 202, 204 and 206 is associated with another user, such as recruitment activity data being associated with recruit 112, the aforementioned data may also be associated with the user record for recruit 112.

FIG. 2 also shows that recruit 112 may enter various data sets into repository 104 for processing and management by program logic 150 on server 102. Recruit 112 may enter sales transaction data 208, which pertains to sales of products effectuated by the recruit 112, and recruitment activity data 210, which pertains to recruitment of others to participate in the sales force. Recruit 112 may also enable the entering of other miscellaneous data 212, such as information associated with telephone calls initiated by the recruit, etc.

Data sets 208, 210 and 212 may be entered into repository 104 by the recruit 112 via its client computer 122, using a mobile app or a similar means. Note that data sets 208, 210 and 212 entered into repository 104 are associated with the user record for recruit 112. To the extent that certain information within data sets 208, 210 and 212 is associated with another user, such as any sales, which are inherently related to salesman 110, since he recruited recruit 112, the aforementioned data may also be associated with the user record for salesman 110.

FIG. 2 further shows that administrator 130 may enter various data sets into repository 104 for processing and management by program logic 150 on server 102. Administrator 130 may enter commission data 214 or sales award milestone data pertaining to one or more users. Administrator 130 may also enter offer data 216, which may comprise a coupon, a discount, a group buying offer, a deal of the day or the like. Administrator 130 may also enable the entering of other miscellaneous data, such as information associated with telephone calls initiated by the administrator, etc. Data sets 214 and 216 may be entered into repository 104 by the administrator 130 via its client computer 132. Note that data sets 214 and 216 entered into repository 104 are associated with the user record to which the data pertains.

The data sets entered by the various parties may be processed by program logic 150 on server 102 and presented for viewing to administrator 130, salesman 110 and recruit 112 as processed data 270 via network 106. Processed data 270 may be processed so as to provide compilations or aggregations of the data sets entered by various users into repository 104, such as cumulative data and trend data. For example, processed data 270 may display cumulative sales for each user (by dollar amount and item volume), cumulative sales for groups of recruits recruited by a user, cumulative sales for user or group as it corresponds to certain time intervals or shown over a period of time, total number of recruits for a user, total number of recruits for a user's recruits, projected sales for a user and for the user's recruits, etc.

In one embodiment, the processed data 270 includes commission information for each salesman 110, recruit or customer 112. The commission information may include the past, current or future amount of commission(s) earned by each salesman/recruit/customer according to the formula for calculating a commission, which resides in the data 214 entered by the administrator 130. The formula for calculating a commission may comprise, for example, a certain percentage of gross or net sales of an individual and a certain percentage of gross or net sales of an individual's recruits. The formula for calculating a commission may also take other data into account, such as volume of sales, speed of sales, etc.

Processed data 270 may further be processed using any statistical technique to aid interpretation of data. Program logic 150 may also provide for differing views of the processed data 270.

Figure 3:
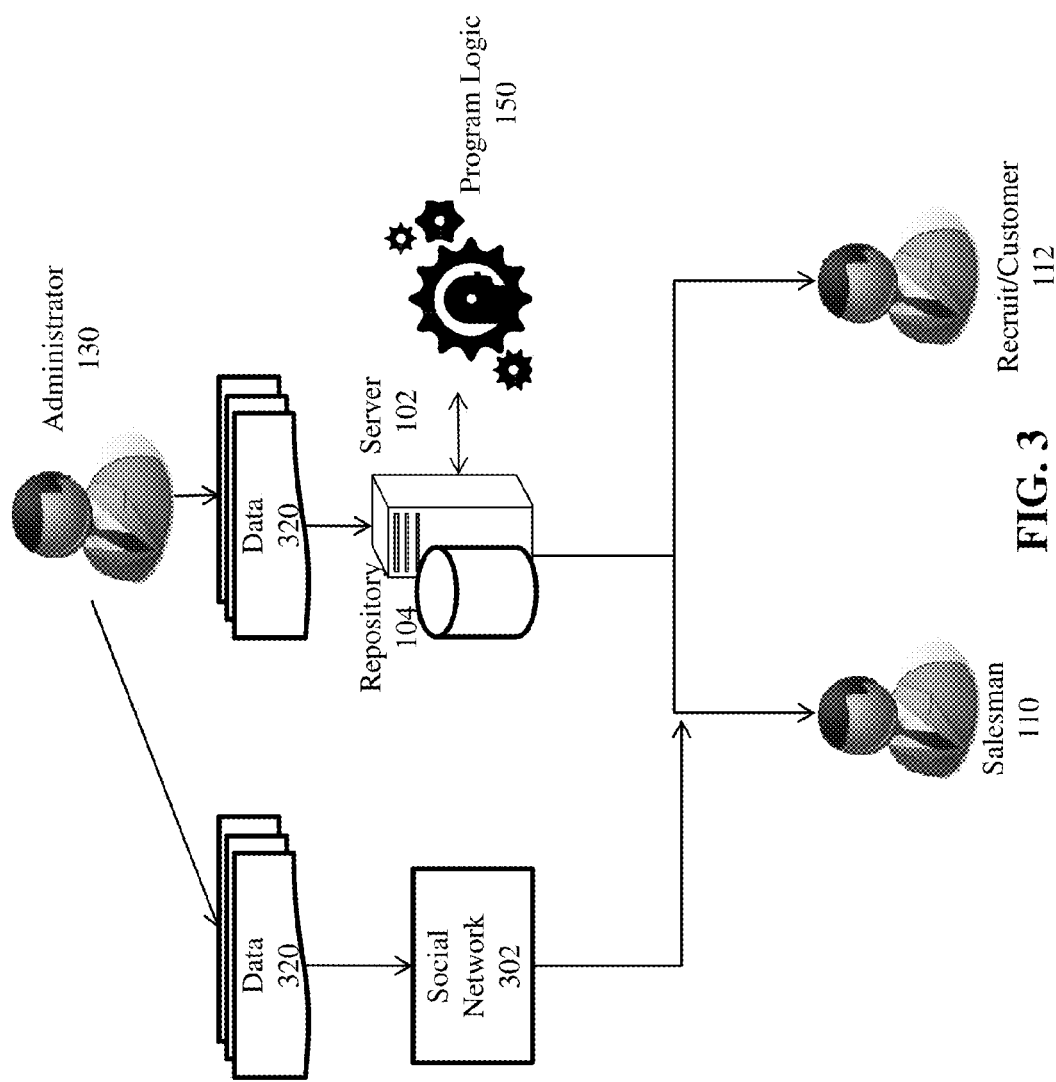
FIG. 3 is a block diagram showing advertising and promotion methods, including group buying offers, according to one embodiment of the present invention.

FIG. 3 is a block diagram showing advertising and promotion methods, including group buying offers, according to one embodiment of the present invention. The block diagram of FIG. 3 illustrates the process of advanced methods of issuing promotions and ads in a direct sales environment.

FIG. 3 describes a process wherein administrator 130 generates an ad or promotion (hereinafter referred to as an "offer") and the server 102 disseminates it to salesman 110 and recruit or customer 112 via push technology. Push technology, or server push, describes a style of Internet-based communication where the ad or promotion, created by administrator 130, is transmitted by the server 102 to clients. Push technology is contrasted with pull technology, where the request for the transmission of information is initiated by the receiver or client. Examples of push technology include HTTP server push, a pushlet, long polling and Flash XML-Socket relays. Note the invention also supports offers being generated by salesman 110 or customer 112 and pushed to others.

FIG. 3 shows that in one embodiment, administrator 130 generates an offer, encapsulated in data packet 320, and sends it to the server 102. The data packet 320 may include a description of goods being promoted, a percentage discount on goods, a price for goods, a rebate on goods, still images, video, audio, a time limit for the promotion or sale, or the like. The data packet 320 may also include data pertaining to the target for the offer, such as a location, a region, a time period, demographic data describing individuals to which the offer is directed and/or specific names or address of the individuals to which the offer is directed. In one embodiment of the present invention, the offer encapsulated in data packet 320 is a group buying offer, which may comprise a product or service description, an image of the product or service, a discount price, a minimum number of acceptances of the offer that are required to trigger the discount price, an expiration date and time for the offer, a current number of acceptances of the offer, computer program code that comprises a countdown timer that counts down to the time at which the group buying offer expires, etc.

In another embodiment, a group buying offer may comprises a tiered discount system wherein a first number of acceptances triggers a first discount price, a second (higher) number of acceptances triggers a second (lower) discount price, a third (even higher) number of acceptances triggers a third (even lower) discount price, etc. In yet another embodiment, a group buying offer may be associated with demographic information (i.e., target data) that defines the targets of the group buying offer. For example, the group buying offer may be associated with an age range, and a geographical location that defines to whom the group buying offer will be disseminated.

The generated data packet 320 is then provided to server 102, wherein logic 150 of server 102 processes the data packet and determines how to implement it. For example, the logic 150 of server 102 may determine to whom the corresponding offer is transmitted, based on the target data specified in the data packet 320. The program logic 150 may accomplish the step of determining to whom the offer shall be transmitted by searching the profiles of users in database 104 for those profiles with data that matches the target data. In another example, the logic 150 of server 102 determines when and for how long the offer is valid, based on information specified in the data packet 320.

Once processed, the server 102 transmits the corresponding offer to the intended recipients, such as users 110 and 112, via push technology at the specified time. Specifically, server 102 transmits the offer to the mobile computers 120 and 122 of the users 110 and 112, respectively. In one embodiment, the server 102 transmits offers specified in the data packet 320 based on a location based service. A location based service is an information or entertainment service, accessible with mobile devices through the mobile network and utilizing the ability to make use of the geographical position of the mobile device. In this embodiment, the corresponding data packet 320 may specify that an offer shall be transmitted solely to users that are located within a specified geographical area. Consequently, the server 102 transmits the offer of the data packet 320 based on the location of the users 110 and 112, as provided by the location based service.

In one embodiment, the generated data packet 320 is provided to a third party social network 302 via the web 106, which processes the data packet and determines how to implement it, similar to the implementation of server 102. Once processed, the social network 302 transmits the corresponding offer to the intended recipients, such as users 110 and 112. Specifically, the social network 302 transmits the offer to the mobile computers 120 and 122 of the users 110 and 112. In yet another embodiment, the third party social network 302 transmits offers specified in the data packet 320 based on a location based service.

Consequently, users, such as users 110, 112, accept the offer of the data packet 320, which may be a group buying offer. Accepting a group buying offer may comprise transmitting credit card payment information to server 102 and/or payment authority 145. The credit card payment information may be held, and not processed, until the minimum number of sales of the group buying offer occurs. When the expiration time of the group buying offer has occurred, the program logic 150 of server 102 may then determine whether the minimum number of sales of the group buying offer has occurred. If so, the accepting users are notified and the sales of the products or services of the group buying offer are effectuated, using the credit card information previously entered by each purchasing user. Finally, any recruiter associated with a user that has purchased the group buying offer is credited for the sale, which may consequently be used to calculate a commission that is paid to the recruiter.

Figure 4:
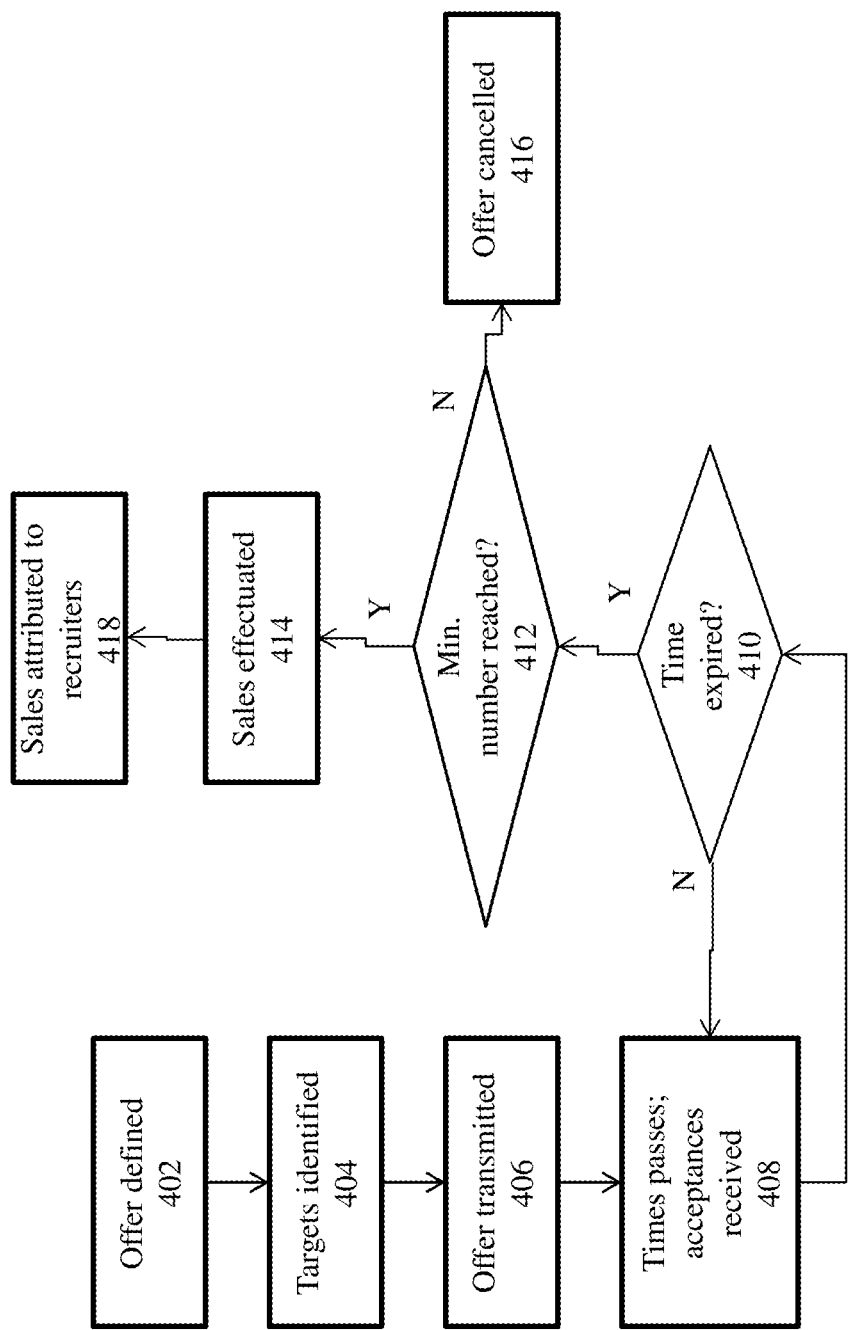
FIG. 4 is a flow chart depicting the control flow of a group buying process, according to one embodiment of the present invention.

FIG. 4 is a flow chart depicting the control flow of a group buying process, according to one embodiment of the present invention. In step 402, administrator 130 defines a group buying offer, which may comprise a product or service description, an image of the product or service, a discount price, a minimum number of acceptances of the offer that are required to trigger the discount price, an expiration date and time for the offer, a current number of acceptances of the offer, computer program code that comprises a countdown timer that counts down to the time at which the group buying offer expires, etc. The group buying offer may further comprise a tiered discount system wherein a first number of acceptances triggers a first discount price, a second (higher) number of acceptances triggers a second (lower) discount price, a third (even higher) number of acceptances triggers a third (even lower) discount price, etc. In yet another embodiment, a group buying offer may be associated with demographic information (i.e., target data) that defines the targets of the group buying offer. Demographic information may include a geographical location, age, sex, marital status, etc.

In step 404, the program logic 150 of server 102 receives the group buying offer and determines to whom it shall be sent depending on the target data associated with the group buying offer. In one embodiment, the mobile computers 120, 122 of the users send current location data to the server 102, which the server 102 utilizes to determine whether, and to whom, the group buying offer shall be transmitted. In step 406, the group buying offer is transmitted to the mobile computers of the users. In step 408, time passes as acceptances are received from users. Accepting a group buying offer may comprise entering electronic payment information, which is authorized for a minimum price and held until the minimum number of sales of the group buying offer occurs.

In step 410, it is determined whether the expiration time of the group buying offer has been reached. If so, then in step 412, the program logic 150 of server 102 determines whether the minimum number of acceptances has occurred. If so, then in step 414, all of the accepting users are notified that the group buying offer is proceeding and sales of the product or service of the group buying offer are effectuated using the electronic payment information that was previously entered by each accepting user. If the minimum number of acceptances has not occurred, then in step 416, all of the accepting users are notified that the group buying offer has been cancelled. In step 418, the program logic 150 of server 102 determines the recruiter, if any, of each of the accepting users, so as to attribute the sale of the product or service to the recruiter. This information may later be used to calculate and effectuate the payment of a commission to the recruiter.

In one embodiment, where the group buying offer comprises a tiered discount system, step 412 comprises the program logic 150 of server 102 determining whether the minimum number of acceptances has occurred, and if so, which tier has been met. Depending on which tier of acceptances has been met, the discounted price of the product or service of the group buying offer is set accordingly. Recall that a first number of acceptances triggers a first discount price, a second (higher) number of acceptances triggers a second (lower) discount price, a third (even higher) number of acceptances triggers a third (even lower) discount price, etc. Thus, in this embodiment, in step 414, all of the accepting users are notified that the group buying offer is proceeding at the given discounted price of the multi-tier system, and sales of the product or service of the group buying offer are effectuated at the given discounted price for that tier.

Consistent with the embodiments described herein, the aforementioned actions performed by elements 132, 102, 120, 122 may be implemented in a computing device. Any suitable combination of hardware, software, or firmware may be used to implement the computing device. A system consistent with an embodiment of the invention may include a plurality of computing devices. In a basic configuration, a computing device may include at least one processing unit and a system memory. Depending on the configuration and type of computing device, system memory may comprise, but is not limited to, volatile (e.g. random access memory (RAM)), non-volatile (e.g. read-only memory (ROM)), flash memory, or any combination or memory. System memory may include an operating system, and one or more programming modules. An operating system, for example, may be suitable for controlling a computing device's operation. In one embodiment, programming modules may include, for example, a program module that performs the functions of program logic 150.

A computing device may have additional features or functionality. For example, a computing device may also include additional data storage devices (removable and/or non-removable) such as, for example, magnetic disks, optical disks, or tape. Such additional storage may be removable storage and a non-removable storage. Computer storage media may include volatile and nonvolatile, removable and non-removable media implemented in any method or technology for storage of information, such as computer readable instructions, data structures, program modules, or other data. System memory, removable storage, and non-removable storage are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computing device. Any such computer storage media may be part of the computing device. A computing device may also have input device(s) such as a keyboard, a mouse, a pen, a sound input device, a camera, a touch input device, etc. Output device(s) such as a display, speakers, a printer, etc. may also be included. The aforementioned devices are only examples, and other devices may be added or substituted.

The computing device may also contain a communication connection that may allow the device to communicate with other computing devices, such as over a network in a distributed computing environment, for example, an intranet or the Internet. The communication connection is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

I claim:

1. A method on a server for managing sales activities and group buying offers for a plurality of users including a first user and a second user over a communications network, comprising:

receiving, via the communications network, recruit enrollment data for the first user, wherein recruit enrollment data includes contact information of the first user and electronic payment information of the first user and authentication data for the first user;

generating a record for the first user in a database, wherein the recruit enrollment data for the first user is associated with the record for the first user;

receiving, via the communications network, an authentication request and the authentication data for the first user from a mobile computer of the first user and authenticating the first user;

receiving in a direct sales environment, recruit enrollment data provided from the second user to the first user;

receiving, via the communications network, the recruit enrollment data for the second user entered by the first user into the mobile computer of the first user, responsive to the second user directly providing the recruit enrollment data to the first user, wherein the recruit enrollment data includes contact information of the second user and electronic payment information of the second user;

generating a record for the second user in the database, wherein the recruit enrollment data for the second user is associated with the record for the second user and wherein the record for the second user is associated with the record for the first user;

receiving, via the communications network, a first sales transaction data entered by the first user into the mobile computer of the first user, responsive to the second user providing the first sales transaction data to the first user in the direct sales environment, wherein the first sales transaction data comprises at least one product identifier, and a quantity of the product;

processing the first sales transaction data;

associating the first sales transaction data with the record for the second user;

receiving, via the communications network, an authentication request and authenticating data from a mobile computer of the second user and authenticating the second user;

receiving, via the communications network, a second sales transaction data entered by the second user into the mobile computer of the second user;

processing the second sales transaction data;

associating the second sales transaction data entered by the second user with the record of the second user;

accessing data associated with the record of the first user, including data associated with the record of the second user, and generating aggregate data representing cumulative sales effectuated by the first user and representing cumulative sales effectuated by the second user, wherein said aggregate data is based on the first and second sales transaction data read from the records of the first and second users;

transmitting, via the communications network, the aggregate data to the mobile computers of the first user and the second user;

defining via the communications network a group buying offer, wherein the group buying offer comprises at least a product or service description, a discount price, a time deadline for the group buying offer and a minimum number of acceptances of the offer that are required to trigger the discount price;

identifying the plurality of users with mobile computers that have submitted recruit enrollment data to the server, including the first and second users identified as having submitted recruit enrollment data to the server;

transmitting, via the communications network, the group buying offer only to the mobile computers of the plurality of users that were identified, including the mobile computers of the first and second users, wherein the group buying offer includes a countdown timer that counts down to the time deadline of the group buying offer;

receiving via the communication network a number of acceptances of the group buying offer from the mobile computers of the plurality of users identified, including the mobile computers of the first and second users;

calculating the number of acceptances of the group buying offer, wherein the number of acceptances is calculated to be greater than or equal to the minimum number of acceptances of the group buying offer required to trigger the discount price;

triggering the discount price of the group buying offer;

detecting attainment of the time deadline of the group buying offer;

accessing electronic payment information for each of the plurality of users that have submitted acceptances of the group buying offer to the server, including the first and second users, wherein electronic payment information is accessed from the record associated with each of the plurality of users;

effectuating a sale of the product or service of the group buying offer to each of the plurality of users that accepted the offer, including the first and second users, wherein effectuating the sale comprises executing a sales transaction using electronic payment information for each of the plurality of users that accepted the offer; and attributing to the first user the sale of the product or service to the second user, since the first user entered recruit enrollment data for the second user, so as to award a commission to the first user.

2. The method of claim 1, wherein sales transaction data includes at least one or more product identifiers, buyer contact information, product shipping information and electronic payment information.

3. The method of claim 2, wherein recruit enrollment data further includes demographic information.

4. The method of claim 3, wherein aggregate data further comprises cumulative sales effectuated by recruits of the first user.

5. The method of claim 4, wherein aggregate data further comprises cumulative sales effectuated by recruits of the second user.

6. The method of claim 1, wherein a group buying offer further comprises a current number of acceptances of the group buying offer.

7. The method of claim 1, wherein the step of transmitting the group buying offer further comprises:

transmitting computer program code to the mobile computers of the plurality of users that were identified together with the group buying offer, wherein the computer program code comprises a countdown timer that counts down to the time deadline at which the group buying offer expires.

8. The method of claim 1, wherein the step of transmitting the group buying offer further comprises:
    transmitting the group buying offer to the mobile computers of a plurality of users that were identified and that are located in a defined geographical area.

9. The method of claim 1, wherein the step of transmitting the group buying offer further comprises:
    transmitting the group buying offer to the mobile computers of a plurality of users that were identified and that possess attributes that match a given description for one or more of the following attributes: account status, age, sex, income range, marital status, previous buying behavior.

* * * * *